United States Patent [19]
Harrison et al.

[11] Patent Number: 6,018,117
[45] Date of Patent: Jan. 25, 2000

[54] DEVICE FOR FAMILIARIZING A CHILD WITH A MUSICAL INSTRUMENT

[75] Inventors: Joyce I. Harrison; Michael W. Harrison, both of Ridgefield, Conn.

[73] Assignee: Joymas Inc., Ridgefield, Conn.

[21] Appl. No.: 09/090,517

[22] Filed: Jun. 4, 1998

[51] Int. Cl.⁷ .................................................. G09B 15/00
[52] U.S. Cl. .......................................... 84/470 R; 84/476
[58] Field of Search .............................. 84/423 R, 470 R, 84/476; 434/227

[56] References Cited

U.S. PATENT DOCUMENTS

| | | |
|---|---|---|
| D. 255,370 | 6/1980 | Hayama et al. . |
| D. 322,640 | 12/1991 | Billings . |
| D. 355,923 | 2/1995 | Slater . |
| D. 355,924 | 2/1995 | Slater . |
| 1,284,400 | 11/1918 | McQuat . |
| 1,431,529 | 10/1922 | De La Parelle . |
| 2,236,638 | 4/1941 | Adams . |
| 3,130,627 | 4/1964 | Aaron . |
| 3,750,524 | 8/1973 | Lee et al. . |
| 3,982,463 | 9/1976 | Waters, Jr. . |
| 4,736,665 | 4/1988 | Sorribes Arambul . |
| 4,924,743 | 5/1990 | Tsai . |

*Primary Examiner*—Jeffrey Donels
*Attorney, Agent, or Firm*—Ware Fressola Van Der Sluys & Adolphson LLP

[57] ABSTRACT

A device for familiarizing a child with a keyboard of a musical instrument and for familiarizing a child with musical concepts. The device comprises at least two blocks, each block having a top face which comprises indicia resembling at least one of the keys of the keyboard. All of the blocks have indicia resembling the white keys of a piano keyboard, and some of the blocks have indicia resembling at least one of the black keys of a piano keyboard.

In an embodiment of the present invention, the device is further comprised of a base having at least one raised projection and/or one indentation for fitting within a corresponding indentation or projection in at least one of the blocks.

In another embodiment of the present invention, at least one of the blocks has an indentation and another of the blocks has a raised projection for fitting around the indentation. In this embodiment, the blocks can be assembled without a base.

17 Claims, 8 Drawing Sheets

DEVICE FOR FAMILIARIZING A CHILD WITH A MUSICAL INSTRUMENT

BACKGROUND OF THE INVENTION

1. Field of the Invention

The present invention relates generally to devices for teaching a child, and in particular to devices for familiarizing a child with a musical instrument having a keyboard, as for example, a piano keyboard, and for familiarizing a child with musical concepts.

2. Discussion of Related Art

In the prior art, it is known to use a chart and a set of dummy keys, some of which resemble the white keys of a piano keyboard and some of which resemble the black keys of a piano keyboard, to teach the arrangement and names of the keys of a standard piano keyboard. The chart is marked with the alphabetical names of the keys represented on the chart and the dummy keys are marked with the alphabetical names and/or staff notations. The chart is placed in an upright position on a piano keyboard by slipping the chart into the space adjacent to the rear ends of the black keys of the keyboard. Then the dummy keys are placed over the piano keyboard keys in their proper position relative to the divisions on the chart.

Such devices are not well suited to the needs of young children since both the keyboard and the chart are often unfamiliar to them. These devices also require the dummy keys to be matched with the chart by placing the dummy keys over the keyboard, thereby presenting the child with the opportunity to press the keys of the keyboard instead of concentrating on the proper placement of the dummy keys with respect to the chart.

It is also known in the prior art to color code interfitting dummy white keys and dummy black keys. Color is added to the dummy keys so that dummy keys of the same diatonic scale share the same color in order to teach a music student the diatonic scales. While such devices may be appropriate for some music students, such devices do not permit a young child to easily and properly position the dummy keys since many keys will share the same color. An inability to easily and properly position the dummy keys may frustrate the young music student and thereby inhibit the child's enthusiasm for learning.

SUMMARY OF THE INVENTION

Accordingly, it is an object of the present invention to familiarize a child with a musical instrument having a keyboard.

It is a further object of the present invention to familiarize a child with musical concepts, for example the names of notes and how the notes are represented, for example on musical staves.

Still another advantage of the present invention is that the device can be easily transported and used where there is no keyboard.

Other advantages of the present invention include developing and improving finger dexterity, spatial reasoning, hand-eye coordination, and imagination, particularly with respect to associating tones with devices for making tones.

The foregoing objective is realized by the present invention which comprises a base having at least one raised projection and at least two blocks, wherein each of the blocks has indicia resembling a keyboard of a musical instrument.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which.

BEST MODE FOR CARRYING OUT THE INVENTION

FIGS. 1–4 show a first embodiment of the device 10 of the present invention, which comprises a base 14 and a plurality of blocks 22. The base 14 has a primary-top surface 26 and a plurality of raised projections 18 extending upward from the primary-top surface 26. The base 14 may be further comprised of indicia 30 indicating the alphabetical names or musical staff representations of notes of the musical instrument for indicating the proper position of the blocks 22. In addition, the base 14 may be further comprised of a raised rim-edge 34 for assisting in properly positioning the blocks 22.

Figure 2:
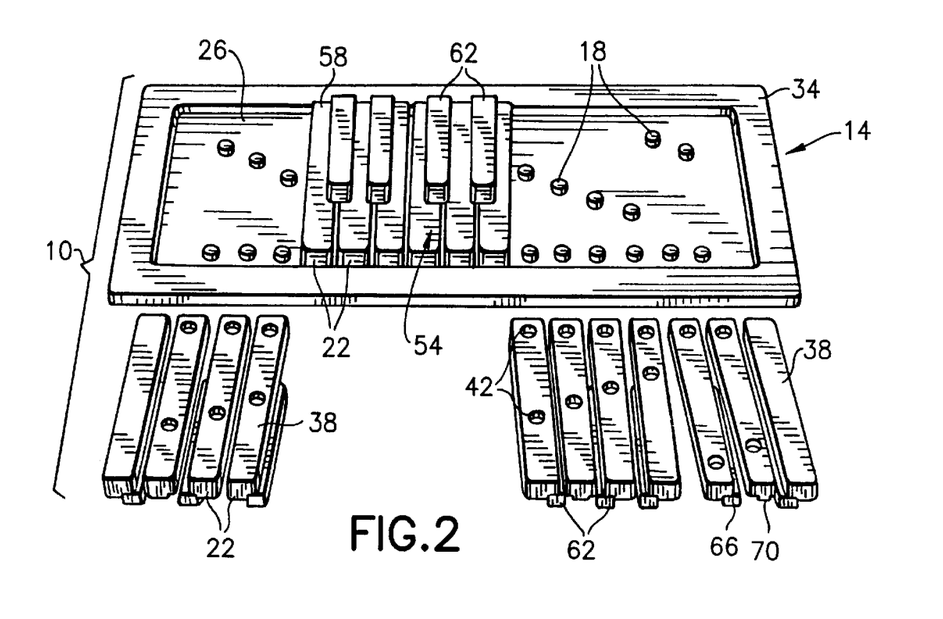
FIG. 2 is a perspective view of the first embodiment of the device of the present invention partially assembled.
Figure 3:
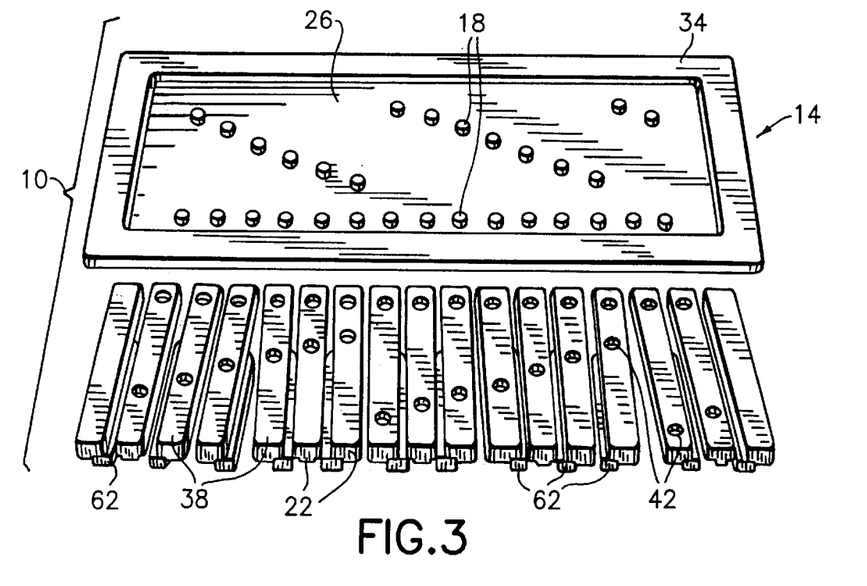
FIG. 3 is a perspective view of the first embodiment of the device of the present invention in its disassembled form.

As shown in FIG. 2, each block 22 has a first-bottom face 38 and a second-top face 54. As shown in FIGS. 2 and 3, on the first-bottom face 38 of some of the blocks 22, there are indentations 42, each indentation 42 corresponding to and shaped to fit over one of the raised projections 18 in the base 14. The indentations 42 may be comprised of a plurality of flat surfaces or, as shown in FIGS. 2 and 3, the indentations may be comprised of a closed-curve surface, or both. Furthermore, the indentations may be shaped to resemble numbers, letters, notes, notes on staves, or treble and bass clef symbols. It should be noted that although the blocks 22 depicted in FIGS. 2 and 3 have either no indentations or two indentations 42 per block 22, each block 22 may have any number of indentations.

Figure 1:
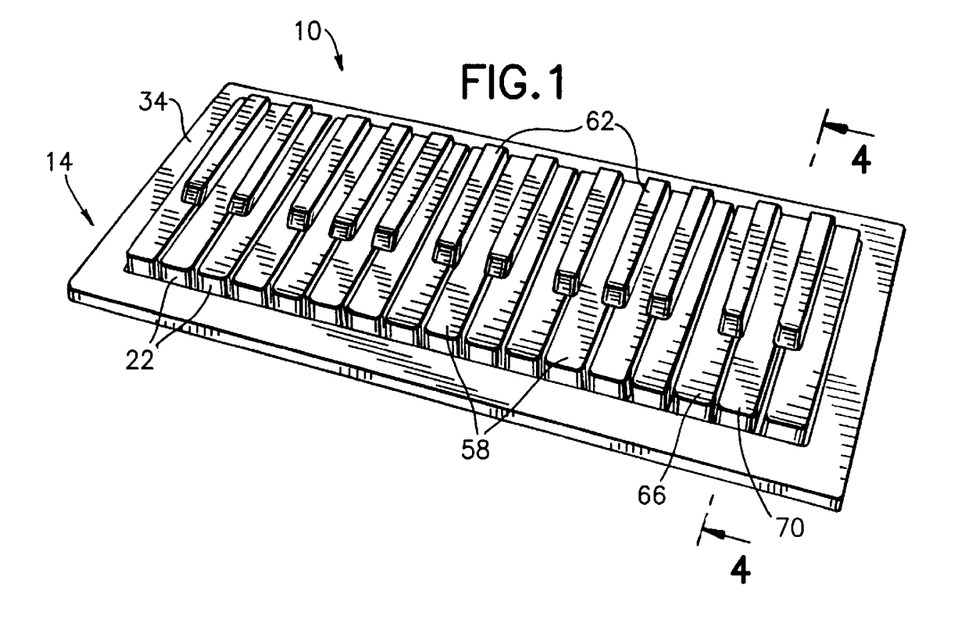
FIG. 1 is a perspective view of a first embodiment of the device of the present invention in its assembled form.

Each block 22 has a second-top face 54 which resembles at least one of the keys of a keyboard of a musical instrument. For example, as shown in FIG. 1, the second-top face 54 of the blocks 22 are each comprised of a white surface 58 resembling a white key of a piano keyboard. The second-top face 54 may be further comprised of a raised finger-rib 62 resembling a black key of a piano keyboard.

Figure 4:
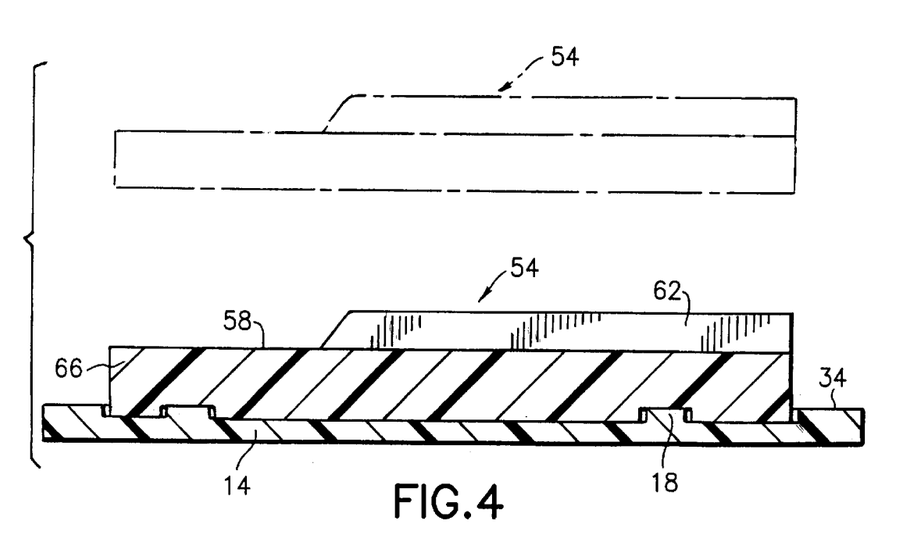
FIG. 4 is a cross-sectional side view of the first embodiment of the device of the present invention taken along the line 4—4 shown in FIG. 1.
Figure 5:
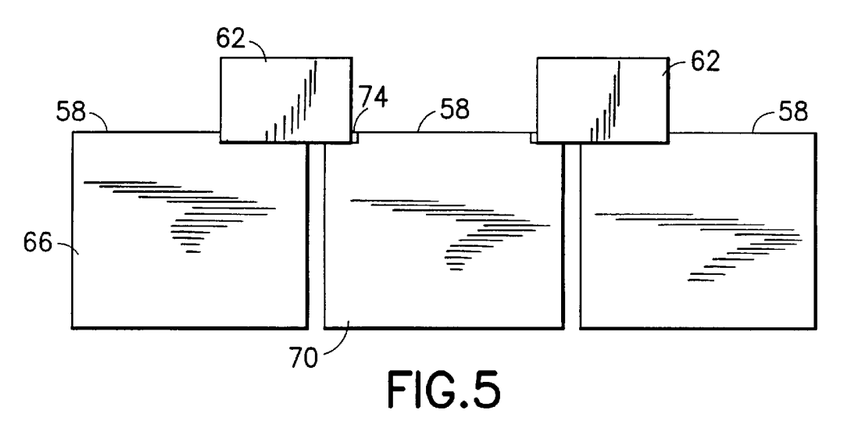
FIG. 5 is a rear end view of three representative blocks shown in FIG. 1.
Figures 6, 7:
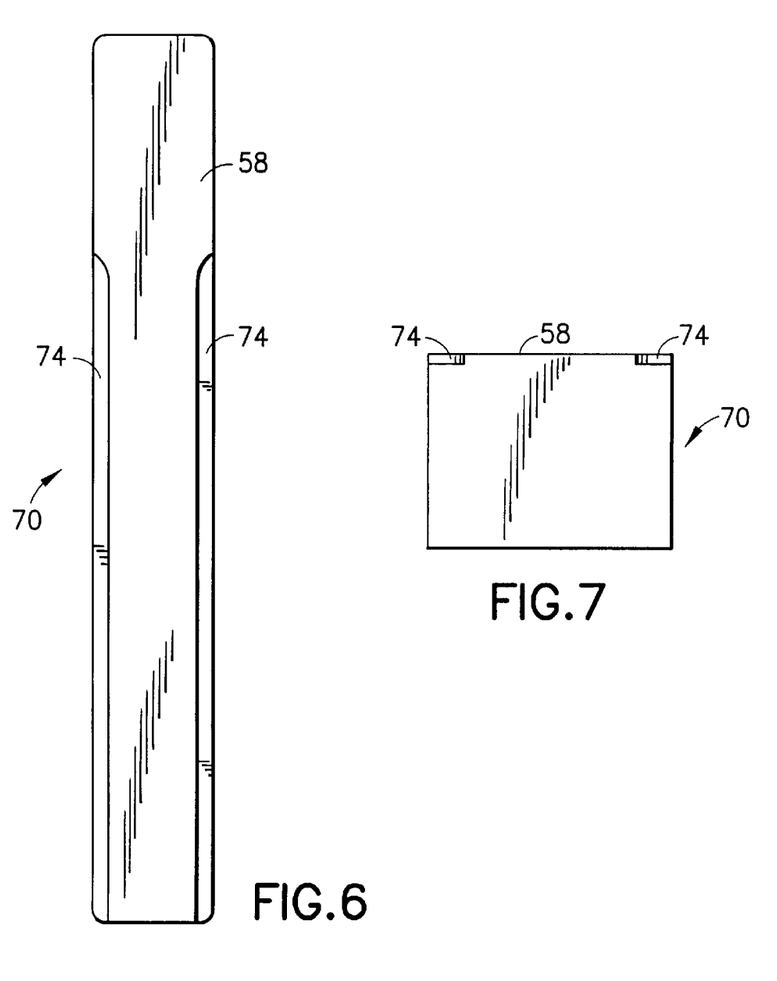
FIG. 6 is a top view of one of the blocks shown in FIG. 5.
FIG. 7 is a rear end view of the block shown in FIG. 6.
Figure 8:
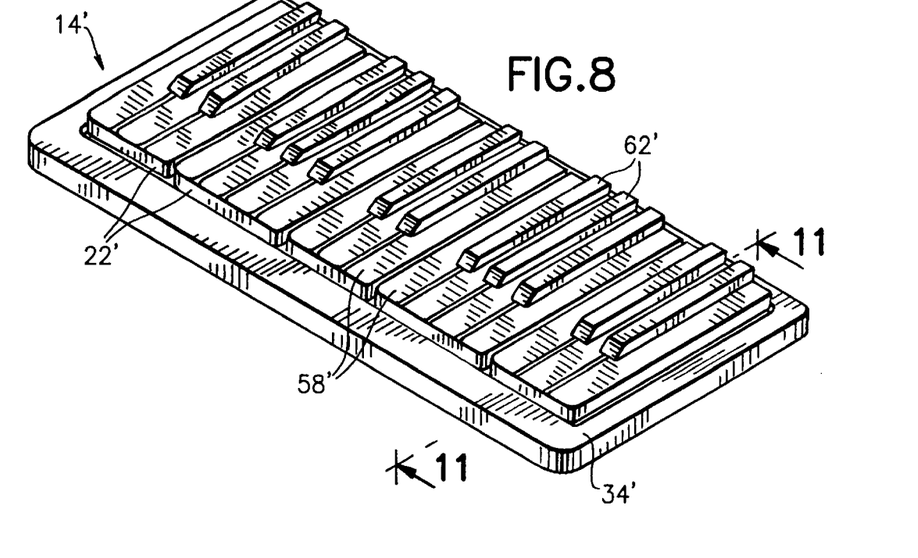
FIG. 8 is a perspective view of a second embodiment of the device of the present invention in its assembled form.
Figure 9:
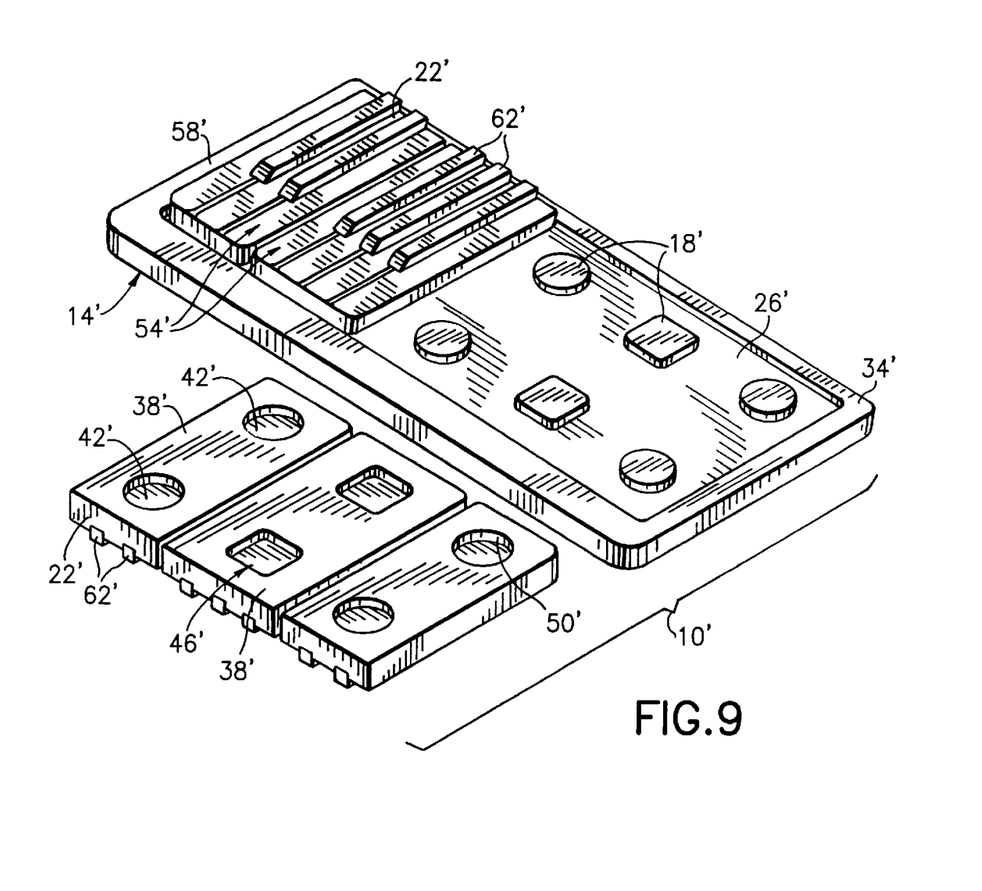
FIG. 9 is a perspective view of the second embodiment of the device of the present invention partially assembled.
Figure 10:
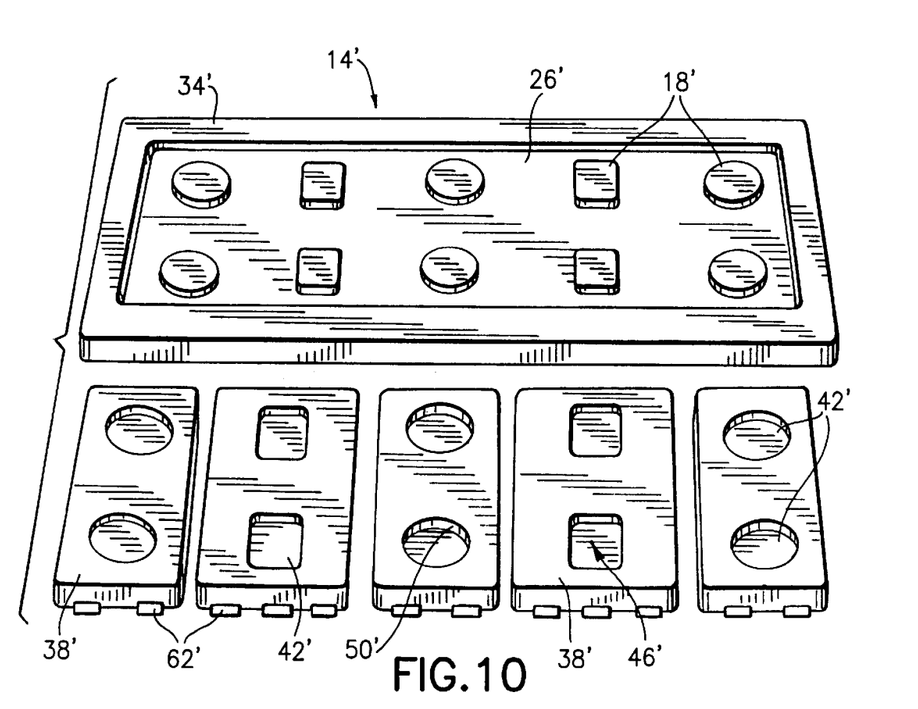
FIG. 10 is a perspective view of the second embodiment of the device of the present invention in its disassembled form.
Figure 11:
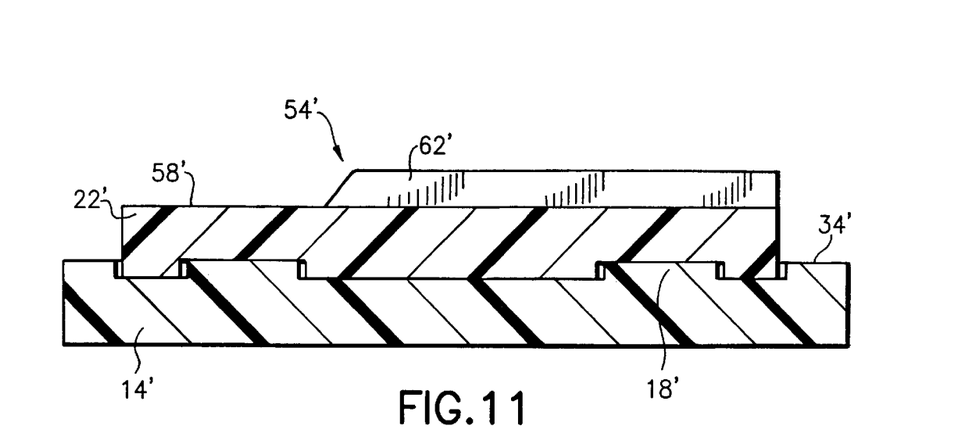
FIG. 11 is a cross-sectional side view of the second embodiment of the device of the present invention taken along the line 11—11 shown in FIG. 8.
Figure 12:
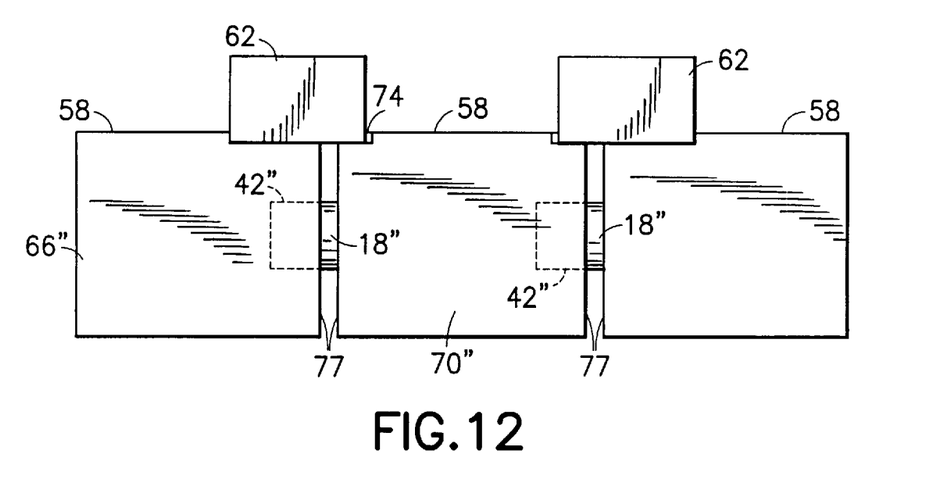
FIG. 12 is a rear end view of three representative blocks according to a third embodiment of the present invention.
Figure 13:
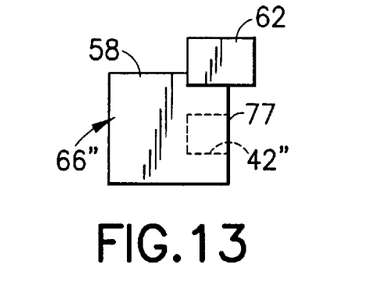
FIG. 13 is a rear end view of a block shown in FIG. 12.
Figure 14:
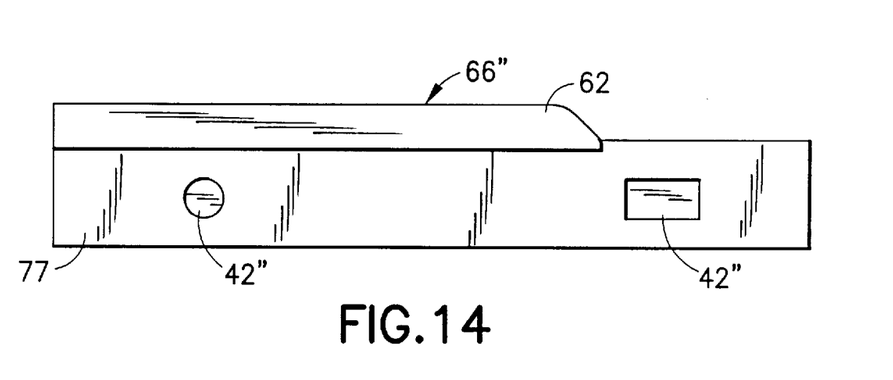
FIG. 14 is a side view of the block shown in FIG. 13.
Figure 15:
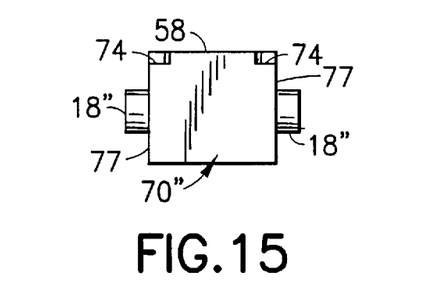
FIG. 15 is a rear end view of a block shown in FIG. 12.
Figure 16:
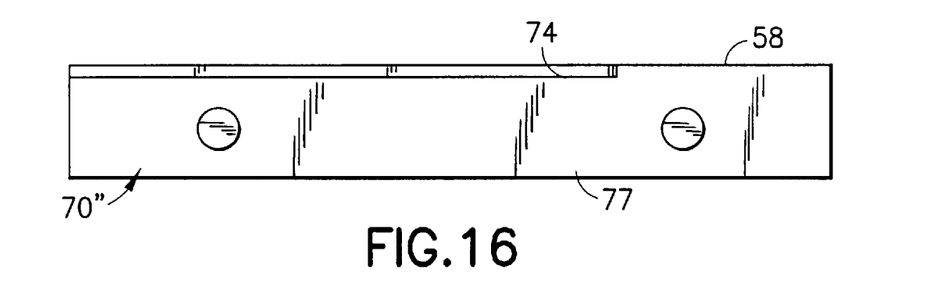
FIG. 16 is a side view of the block shown in FIG. 15.
Figure 17:
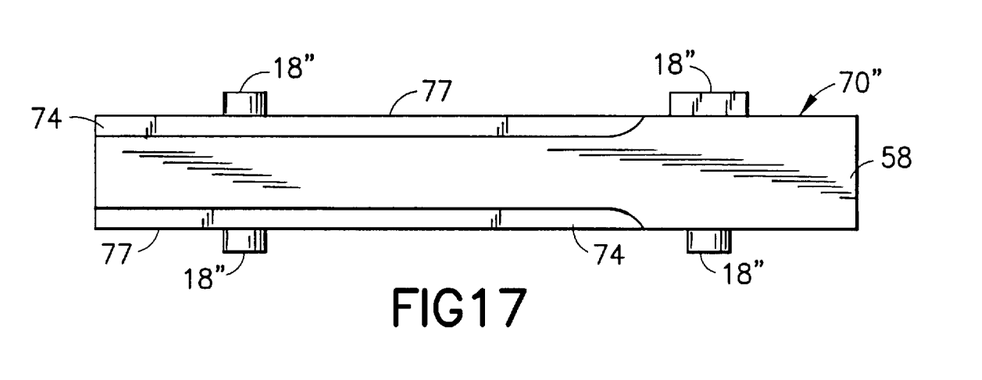
FIG. 17 is a top view of the block shown in FIG. 16.

FIG. 4 depicts a representative block 66 of the first embodiment of the present invention having a raised finger-rib 62 and white surface 58. As shown in FIG. 5, the raised finger-rib 62 extends from the associated white surface 58 and hangs over the white surface 58 of the adjacent block 70. The portion of the raised finger-rib 62 which hangs over the adjacent white surface 58 fits within an indentation 74 in the white surface 58 of adjacent block 70, which is best seen in FIGS. 6 and 7.

In FIGS. 8–11, there is shown a second embodiment of the present invention. In FIGS. 8–11, features similar to features in FIGS. 1–7 are similarly labeled with numbers having a "'" appended thereto. The second embodiment is comprised of blocks 22', each of which have a first-bottom face 38', and a second-top face 54'. In the second embodiment shown in FIGS. 9 and 10, the first-bottom face 38' of each block 22' has two indentations 42', each indentation 42' corresponding to and shaped to fit over one of the raised projections 18' of the base 14'. An indentation 42' may be comprised of a plurality of flat surfaces 46' and/or may be comprised of a closed-curve surface 50'.

On the second-top face 54', the blocks 22' each have indicia resembling more than two keys of a keyboard of a musical instrument, such as a piano. In the second embodiment shown in FIGS. 8–11, such indicia are comprised of raised finger-ribs 62' resembling the black keys of a piano keyboard, and a white surface 58' disposed around the raised finger-ribs 62' for resembling the white keys of a piano keyboard.

Although the base 14, 14' has been described as having raised projections 18, 18', and the blocks 22, 22' have been described as having indentations 42, 42', it should be noted that the present invention is not limited to this arrangement. For example, the blocks 22, 22' may be formed to have the projections 18, 18' and the base 14, 14' may have corresponding indentations. Alternatively, some of the blocks 22, 22' may have indentations 42, 42' and some of the blocks 22, 22' may have projections 18, 18' for fitting with the base 14, 14', which has both projections 18, 18' and indentations 42, 42' corresponding to the blocks 22, 22'. Finally, some of the blocks 22, 22' may have both projections 18, 18' and indentations 42, 42', and the base 14, 14', in such a case, would have corresponding projections 18, 18' and indentations 42, 42'.

FIGS. 12–17 show a third embodiment of the present invention. In FIGS. 12–17 features which are similar to features depicted in FIGS. 1–11 are similarly labeled with numbers having a "''" appended thereto. In the third embodiment of the present invention depicted in FIGS. 12–17, a first representative block 66" has an indentation 42" on mating side 77. A second representative block 70" has raised projections 18" for fitting and holding in the proper position the block 66" to relative to block 70". By placing indentations 42" and projections 18" on the mating sides 77 of the blocks 66", 70", the third embodiment of the present invention can be assembled without the base 14, 14' (shown in FIGS. 1–4 and 8–11). Although representative blocks 66", 70" are shown having either indentations 42" or projections 18", it should be noted that a block may have both an indentation 42" and a projection 18". As in the first and second embodiments described above, the indentations 42" and projections 18" may be comprised of a plurality of flat surfaces and/or a closed-curve surface.

Figure 18:
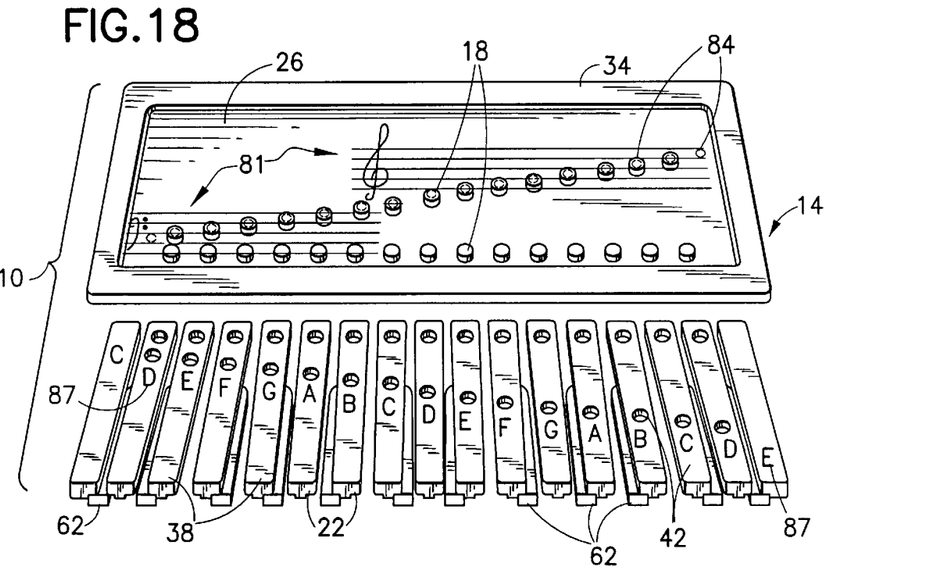
FIG. 18 is a perspective view of a modification of the first embodiment of the device of the present invention in its disassembled form showing staves and notes on the base and the names of notes on the bottom faces of the blocks.
Figure 19:
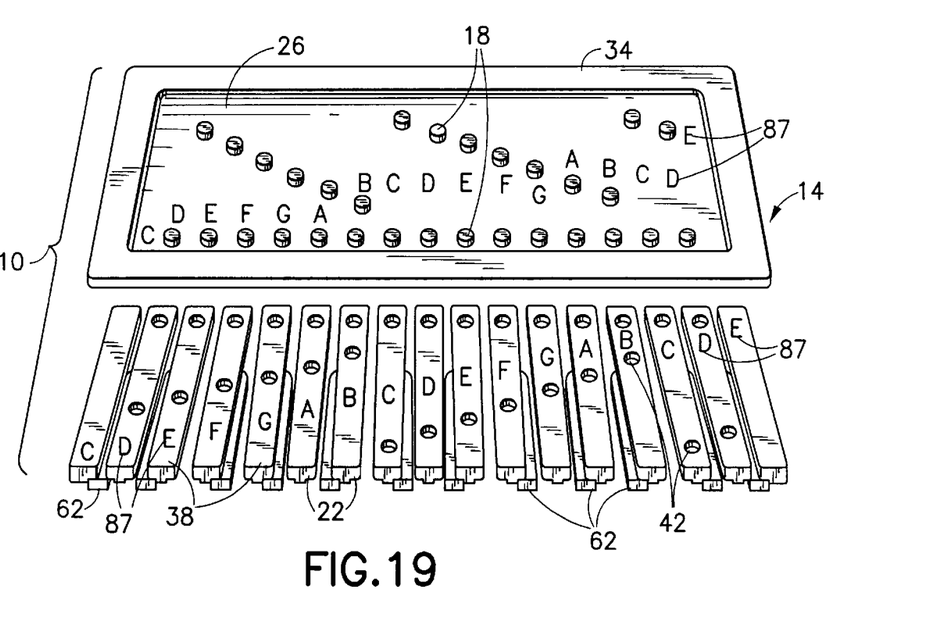
FIG. 19 is a perspective view of the first embodiment of the device of the present invention in its disassembled form showing the names of notes on the base and on the bottom faces of the blocks.

FIGS. 18 and 19 show the first embodiment of the present invention having indicia on the base 14 and the blocks 22. The indicia on the base 14 is depicted in FIG. 18 as comprising staves 81 with notes 84 on the staves 81. Although FIG. 18 depicts the present invention wherein some of the notes 84 on the staves 81 correspond with some of the raised projections 18, the raised projections 18 need not correspond with the notes 84. As shown in FIG. 18, the blocks 22 have indicia comprising the names 87 of the notes represented on the base 14. The indicia on the base 14 and the blocks 22 can be used to assist the music student with properly positioning the blocks 22 by matching a note 84 with the corresponding name 87.

As shown in FIG. 19, the indicia on the base 14 may be comprised of the names 87 of notes. In such an embodiment, the names 87 on the base 14 are matched with the names 87 on the blocks 22 in order to assist the music student with properly positioning the blocks 22 on the base 14.

It should be apparent that the indicia depicted in FIGS. 18 and 19 can be used also with the second and third embodiments described herein.

It will now be apparent to those skilled in the art that the present invention provides a means for familiarizing a child with the keyboard of a musical instrument which does not require the use of the keyboard itself or a chart. Furthermore, the present invention provides means for assisting a music student with properly and easily placing the blocks in the correct position relative to one another, thereby fostering an enthusiasm for learning and an interest in learning to play a musical instrument. In addition, the present invention can assist in developing and improving finger dexterity, spatial reasoning, hand-eye coordination, and imagination, particularly with respect to associating tones with devices for making tones. Finally, the present invention provides means for familiarizing a child with musical concepts, such as the names of notes and how notes are represented on the treble and bass clefs.

Although the present invention has been described with respect to one or more particular embodiments of the device, it will be understood that other embodiments of the present invention may be made without departing from the spirit and scope of the present invention. Hence, the present invention is deemed limited only by the appended claims and the reasonable interpretation thereof.

What is claimed is:

1. A device for familiarizing a child with musical concepts and with a keyboard of a musical instrument embodying said concepts comprising:

a base having a primary-top surface and a raised projection extending upward from the primary-top surface;

at least one first block and at least one second block, each block having a first-bottom base-engaging face and a second-top face, wherein each first block has an indentation on the first-bottom face, the indentation corresponding to and shaped for removable engagement to fit over one said raised projection for positioning the first block on the base, and the second-top faces of the first block and the second block each have a means for resembling at least one of the keys of a keyboard of said musical instrument.

2. The device of claim 1, wherein the means for resembling at least one of the keys of a keyboard of a musical instrument on the second-top faces comprises a white colored surface resembling a white key of a piano keyboard.

3. The device of claim 2, wherein the means for resembling at least one of the keys of a keyboard of a musical instrument on at least one of the second-top faces comprises a raised finger-rib resembling a black key of a piano keyboard.

4. The device of claim 1, further comprising indicia displayed on the base and indicating the identification of notes of the musical instrument for indicating the proper position of each said first block and each said second block.

5. The device of claim 1, wherein the base has a raised rim-edge for assisting in properly positioning the first block and the second block.

6. The device of claim 1, including a plurality of said first blocks shaped for laterally arrayed engagement along said primary top surface resembling the keyboard of said musical instrument, and a corresponding plurality of said raised projections respectively engaging the indentations of said plurality of first blocks positioning said first blocks in laterally arrayed engagement.

7. A device for familiarizing a child with musical concepts and with a keyboard of a musical instrument embodying such concepts comprising:

at least one first block having a protruding lateral projection and a top face with means for resembling at least one of the keys of a keyboard of said musical instrument;

and a second block having a lateral indentation corresponding to and shaped for removable engagement around the protruding lateral projection of the first block for positioning the second block adjacently beside the first block, and having a top face with means for resembling at least one of the keys of a keyboard of said musical instrument.

8. The device of claim 7, wherein the means for resembling at least one of the keys of a keyboard of a musical instrument on each of the top faces of the first block and the second block comprises a white colored surface resembling a white key of a piano keyboard.

9. The device of claim 8, wherein the means for resembling at least one of the keys of a keyboard of a musical instrument on at least one of the top faces comprises a raised finger-rib resembling a black key of a piano keyboard.

10. The device of claim 8, wherein the means for resembling at least one of the keys of a keyboard of a musical instrument on at least one of the top faces comprises a raised finger-rib resembling a black key of a piano keyboard.

11. A device for familiarizing a child with musical concepts and with a keyboard of a musical instrument comprising:

a base having a primary-top surface and a raised projection extending upward from the primary-top surface, and defined at least in part by a closed-curve peripheral surface;

a first block and a second block, each block having a first-bottom face shaped to rest on the primary top surface of the base and a second-top face, wherein the first block has an indentation defined at least in part by a closed-curved surface on the first-bottom face, the indentation corresponding to and shaped for removable engagement over the raised projection for positioning the first block on the base, and the second-top faces of the first block and the second block each have a means for resembling at least one of the keys of a keyboard of said musical instrument.

12. The device of claim 11, wherein the means for resembling at least one of the keys of a keyboard of said musical instrument on the second-top faces comprises a white colored surface resembling a white key of a piano keyboard.

13. The device of claim 11, wherein the means for resembling at least one of the keys of a keyboard of said musical instrument on at least one of the second-top faces comprises a raised finger-rib resembling a black key of a piano keyboard.

14. The device of claim 11, further comprising indicia displayed on the base and indicating the identification of notes of the musical instrument for indicating the proper position of the first block and the second block.

15. The device of claim 11, wherein the base has a raised rim-edge for assisting in properly positioning the first block and the second block.

16. The device of claim 12, wherein the means for resembling at least one of the keys of a keyboard of a musical instrument on each of the top faces of the first block and the second block comprises a white colored surface resembling a white key of a piano keyboard.

17. A device for familiarizing a child with musical concepts and with a keyboard of a musical instrument comprising:

a first block having a protruding lateral projection with a peripheral surface defined at least in part by a closed-curve, and having a top face with means for resembling at least one of the keys of a keyboard of said musical instrument;

and a second block having a lateral indentation corresponding to and shaped for removable engagement around the protruding lateral projection of the first block for positioning the second block adjacently beside the first block, and having a top face with means for resembling at least one of the keys of a keyboard of said musical instrument.

\* \* \* \* \*